US005218508A

United States Patent [19]

Doone

[11] Patent Number: 5,218,508

[45] Date of Patent: Jun. 8, 1993

[54] ELECTRICAL SURGE ARRESTER/DIVERTER

[75] Inventor: Rodney M. Doone, Burgess Hill, England

[73] Assignee: Bowthorpe Industries Limited, Gatwick, United Kingdom

[21] Appl. No.: 476,326

[22] Filed: Feb. 7, 1990

[30] Foreign Application Priority Data

Feb. 7, 1989 [GB] United Kingdom ................. 8902633
Apr. 18, 1989 [GB] United Kingdom ................. 8908740

[51] Int. Cl.[5] ................................ H02H 9/04
[52] U.S. Cl. ................................ 361/127; 361/117
[58] Field of Search ................................ 174/141 R, 150; 361/117, 126, 127

[56] References Cited

U.S. PATENT DOCUMENTS

| | | | |
|---|---|---|---|
| 1,636,544 | 4/1923 | Atherton | 361/127 |
| 2,608,600 | 8/1952 | Vorts et al. | 361/117 |
| 4,389,693 | 6/1983 | Yanubu et al. | 361/127 |
| 4,456,942 | 6/1984 | Bronikowski | 361/127 |
| 4,502,089 | 2/1985 | Ozawa et al. | 361/117 |
| 4,851,955 | 7/1989 | Doone et al. | 361/117 |

*Primary Examiner*—A. D. Pellinen
*Assistant Examiner*—S. Jackson
*Attorney, Agent, or Firm*—Pollock, Vande Sande & Priddy

[57] ABSTRACT

A high voltage surge arrester comprise plurality of low voltage surge arresters coupled together in a series parallel network, the low voltage arresters being of a high strength polymeric type consisting of a solid core of varistor blocks encased within a glass fibre reinforced plastics shell and housed in a shedded polymeric housing, and the series parallel network consisting of a plurality of series connected stages each of which comprises a generally annular mounting plate formed with an integral corona discharge suppression ring and a plurality of the low voltage surge arresters mounted to the mounting plate at uniformly spaced apart positions. The subject high voltage, series parallel surge arrester can replace conventional station class porcelain housed surge arresters, which are expensive, troublesome to transport and instal and liable to electrical problems, and avoids all of these problems whilst providing numerous significant advantages.

19 Claims, 4 Drawing Sheets

ELECTRICAL SURGE ARRESTER/DIVERTER

FIELD OF THE INVENTION

This invention concerns improvements in or relating to electrical surge arresters, also known as diverters, as used particularly (though not exclusively) in electrical power generation and distribution systems for the safe handling of atmospherically induced surges, arising from lightning strikes, for example, and over-voltages caused by switching operations.

BACKGROUND OF THE INVENTION

Disclosed in applicant's British Patent Application No. 2188199 is a polymer housed solid-state surge arrester which represents a considerable departure from conventional porcelain housed arresters and is finding substantial commercial success. This arrester, which was developed from the arrester that is disclosed in application British Patent No. 2073965, comprises an elongate core constituted, preferably, by a distributed array of zinc oxide varistor blocks and electrically-conductive heat sink/spacer blocks in face-to-face contact between first and second terminal blocks and with the said blocks encased within a rigid shell of reinforced rigid plastic material bonded to the peripheral surfaces of the blocks, and a shedded outer housing for said core comprising a sleeve of polymeric heat-shrink material or elastomeric material shrunk or released tightly onto said core with a weather-proof sealant between the core and the heat-shrink or elastomeric material or comprising in-situ molded synthetic plastic material. The heat sink/spacer blocks are not essential to the arrester of British Patent Application No. 2188199, but provide advantageous voltage grading and thermal distribution effects within the arrester and are preferred for this reason.

As described in GB 2188199, the surge arrester therein disclosed has very considerable physical strength since its construction is based upon a core formed of ceramic varistor blocks and metallic heat-sink/spacer blocks encased within a reinforced plastic shell which is bonded to the surfaces of the blocks. The varistor and heat-sink/spacer blocks can even be adhesively secured in face-to-face contact by use of electrically conductive adhesives, to adds to the physical strength of the core. Specifically mentioned in GB 2188199 is an improvement which can be obtained in the dressing of power distribution poles by virtue of using surge arresters of the construction therein described; by virtue of the great physical strength of the surge arresters per se, stand-off support insulators, which were previously required to ensure that the conventional porcelain arrester was not physically loaded, can be dispensed with, leading to a more cost effective, more readily installed, and aesthetically and environmentally more acceptable installation.

The polymeric surge arrester disclosed in GB 2188199 is inherently well adapted to utilization as a distribution class arrester, and the available sizes of varistor blocks and other limitations have dictated the continued utilization of large size porcelain housed arresters for station class and other high voltage applications. Such large porcelain arresters, wherein the arrester components are sealed within a shedded porcelain housing commonly with an inert gas filling and with elaborate blow-out mechanisms provided to protect the arrester against explosive destruction, are disadvantageous for a variety of reasons. They namely they are expensive to manufacture and test; they are difficult to transport to their utilization site and are prone to damage both during transportation and subsequent erection; they are difficult to install and require the use of heavy lifting equipment; and they are inherently liable to the type of electrical problems that the polymeric arrester of GB 2188199 avoids (e.g., internal ionization leading to degradation of internal components).

SUMMARY OF THE INVENTION

The present invention resides in the realization that the great physical strength of the polymeric surge arrester of GB 2188199 enables such high voltage arresters as station class arresters to be constructed as a series parallel network of a plurality of individually lower voltage arresters of the type described in GB 2188199. Whereas a single polymer housed surge arrester of the type described in GB 2188199 would have insufficient energy absorption capability to meet the IEC line discharge requirements for Class 1 through to Class 5, and furthermore is not sufficiently large to ensure good vertical voltage distribution with minimum radial voltage stress at elevated system voltages corresponding to line discharge Classes 1 to 5, a series parallel network of such polymer housed surge arresters could readily meet these requirements. Basic single unit polymeric housed surge arresters having a rated voltage of 30 KV rms for example, can readily be matched and erected in parallel to meet the energy requirements of a high voltage system, and this parallel arrangement can then be series replicated in order to achieve the required voltage rating for a given transmission system. For example, experiments by applicant conducted have shown that, for a 120 KV rated arrester suitable for a 132 KV effectively earthed system with a line discharge performance of Class 3, a series parallel network of 30 KV rated polymeric housed arresters of the kind described and claimed in GB 2188199 would comprise four series stages each of three parallel connected arresters.

The present invention, in its broadest aspect, thus provides an electrical surge arrester/diverter having a relatively high voltage rating, said arrester/diverter comprising a series parallel network of a plurality of surge arrester/diverters each having a relatively low voltage rating and being of high strength configuration including a core comprising varistor blocks and a polymeric housing.

According to a more particular aspect of the present invention, there is provided a surge arrester having a relatively high voltage rating which comprises a series parallel network of a plurality of surge arresters each having a relatively low voltage rating and each comprising an elongate core comprising varistor blocks and terminal blocks encased within and supported by a rigid shell of reinforced plastic material which preferably (but not essentially) is bonded to the peripheral surfaces of the blocks for maximising the effective support, and a shedded outer housing for said core, comprising a sleeve of polymeric heat-shrink material or elastomeric material shrunk or released tightly onto the core or comprising in-situ moulded synthetic plastic material.

More particularly, and as described in GB 2188199, each of the relatively low voltage rating surge arresters might comprise an elongate cylindrical core, a polymeric sleeve of electrically insulating heat-shrink material having integral sheds shrunk onto said core with a weather-proof sealant between the core surface and the heat-shrunk sleeve so as to achieve a void-free interface therebetween, and end caps capping the interface between the core and the sleeve at both ends thereof, and with a weather-proof sealant between the end caps and the heat-shrunk sleeve so as to achieve a void free interface therebetween, said core comprising a cylindrical terminal block at each end thereof and, between said terminal blocks, a plurality of cylindrical zinc oxide varistor blocks and a plurality of cylindrical aluminum heat-sink/spacer blocks distributed to provide voltage grading throughout the length of the core with a predetermined core length arcing distance, said varistor blocks having metallized electrodes on end faces thereof held and preferably adhered by means of conductive adhesive in physical and electrical contact in each case with a contiguous end face of another varistor block or a respective one of the other type blocks, and said terminal blocks, varistor blocks and heat shrink spacer blocks being retained rigidly together in the core by means of a shell of glass reinforced cured rigid epoxy resin material desirably, but not essentially, bonded to the curved outer surfaces of the respective blocks without voids and gas entrapment and conveniently formed as a wrapping or winding upon the pre-assembled blocks of a pre-preg sheet or filamentary material.

Instead of a heat-shrink material outer housing, the relatively low voltage rating surge arresters could be formed as aforementioned with elastomeric outer housings released onto their cores or with in-situ moulded plastic housings. The end cap arrangement could be varied and the aluminum heat-sink/spacer blocks could be omitted or could be made of a different material. Variations could likewise be made to the rigid shell and in its method of formation without departure from the present invention, the essence of the invention being in its utilization of a high strength structure rather than in the particular attainment of such high strength.

The following tabulation (Table 1) has been produced as the result of laboratory tests and demonstrates the number of series parallel networks of polymeric arresters that might be required in accordance with the teachings of the present invention to satisfy IEC 99-1 transmission line discharge classes. The tabulation is based on the use of 24 KV rated polymeric units.

TABLE 1

| ARRESTER RATED VOLTAGE KV RMS | LINE DISCHARGE CLASS | NO. OF 24 KV UNITS IN PARALLEL | NO. OF PARALLEL UNITS IN SERIES |
|---|---|---|---|
| 120 | 3 | 3 | 5 |
| 192 | 3 | 3 | 8 |
| 240 | 4 | 4 | 10 |
| 360 | 4 | 4 | 15 |
| 432 | 4 | 4 | 18 |
| 456 | 5 | 5 | 19 |

The rated voltages of the units in parallel can be selected in order to meet the required voltage rating, and there is no restriction to 24 KV units. However, experience dictates that unit ratings most conveniently will be 24 KV, 30 KV or 36 KV, and corresponding polymeric arresters are described in GB 2188199.

The series parallel configuration of the subject high voltage surge arrester may be achieved by use of mounting plates which serve to provide the parallel connections of the plural series arrester stages, the mounting plates desirably being generally circular, and the unitary surge arresters making up each series stage being uniformly arranged equidistant from each other around the mounting plate so as to avoid undesirable non-uniformities in the electric fields permeating the arrester environment in use. In order to ensure that the voltage distribution of the series parallel network according to the present invention is within acceptable limits, the physical dimensions of the arrangement is of paramount importance, as will readily be appreciated by those skilled in the art. It is considered that the dimensions of the arrangement will be determined by the system voltage and the relationship of electric field strength for a given arrangement diameter above an earthed plane. As mentioned above, it is desirable that the series parallel network of polymeric surge arresters be arranged in a circular arrangement, and the following tabulation (Table 2) provides minimum arrangement diameters determined for maximum system voltages.

TABLE 2

| SYSTEM VOLTAGE KV RMS | MINIMUM DIAMETER OF MOUNTING PLATE (CM) | MIN. DIAMETER OF CORONA RING TUBE |
|---|---|---|
| UP TO 220 | 25 CM | 4.0 CM |
| UP TO 420 | 40 CM | 6.5 CM |
| UP TO 525 | 60 CM | 10.0 CM |

A further important consideration is the elimination of corona discharge at the junction of each parallel network of the series, and the present invention proposes that this requirement be net by use of suitable corona rings provided at each junction. The diameter of the corona rings is determined by the junction voltage although, as a practical matter, it is convenient and effective to fit the same diameter corona rings to all junctions of a series parallel network. Table 2 gives the minimum diameter of corona ring that should be used. The corona rings may be separate structures adapted to be secured to the periphery of the mounting plates, or alternatively and preferably may be formed integrally with the mounting plates. Described hereinafter in detail is an advantageous mounting plate cum corona ring configuration designed to encourage rainwater to flow off the mounting plate surface, this configuration comprising a downwardly depending conical mounting plate formed at its outer circumference integrally with a radiussed corona ring.

The arrangement of the polymeric arresters in each stage of the overall arrester is advantageously rotationally offset from the arrangement of the polymeric arresters in its adjacent stage or stages. By virtue of this arrangement, not only is the assembly of the overall arrester facilitated since the polymeric arresters in the various stages do not line up in the axial direction of the arrester and arrester-to-arrester couplings, between the polymeric arresters are obviated in favor of arrester-to-mounting plate couplings only, but also the dissipation of heat from the polymeric arresters into the coupling plates is facilitated by virtue of the more distributed connections of the polymeric arresters to the mounting plates.

The mounting plates are thus seen as having the functions of (a) providing for the interconnection of the polymeric arresters, (b) providing a fixed electrostatic capacitance with the mounting plates of adjacent stages, which is advantageous as regards neighbouring stages which is advantageous as regards voltage grading throughout the overall arrester, and (c) providing a means of achieving thermal equilibrium between the polymeric arresters in each stage so as to avoid any one of the plural arresters in any stage from overheating relative to its fellows in the respective stage and, by virue of its inherent temperature-dependent resistance, giving rise to electrical imbalance in the respective stage. Where the corona ring is formed integrally with the mounting plate, the mounting plate also serves the additional function of providing the corona ring.

Further features of the present invention are set forth in the appended claims and in order that they and the abovementioned features might be well understood, an exemplary embodiment of the invention will hereinafter be described with reference to the accompanying drawings.

DESCRIPTION OF THE PREFERRED EMBODIMENT

Figure 1:
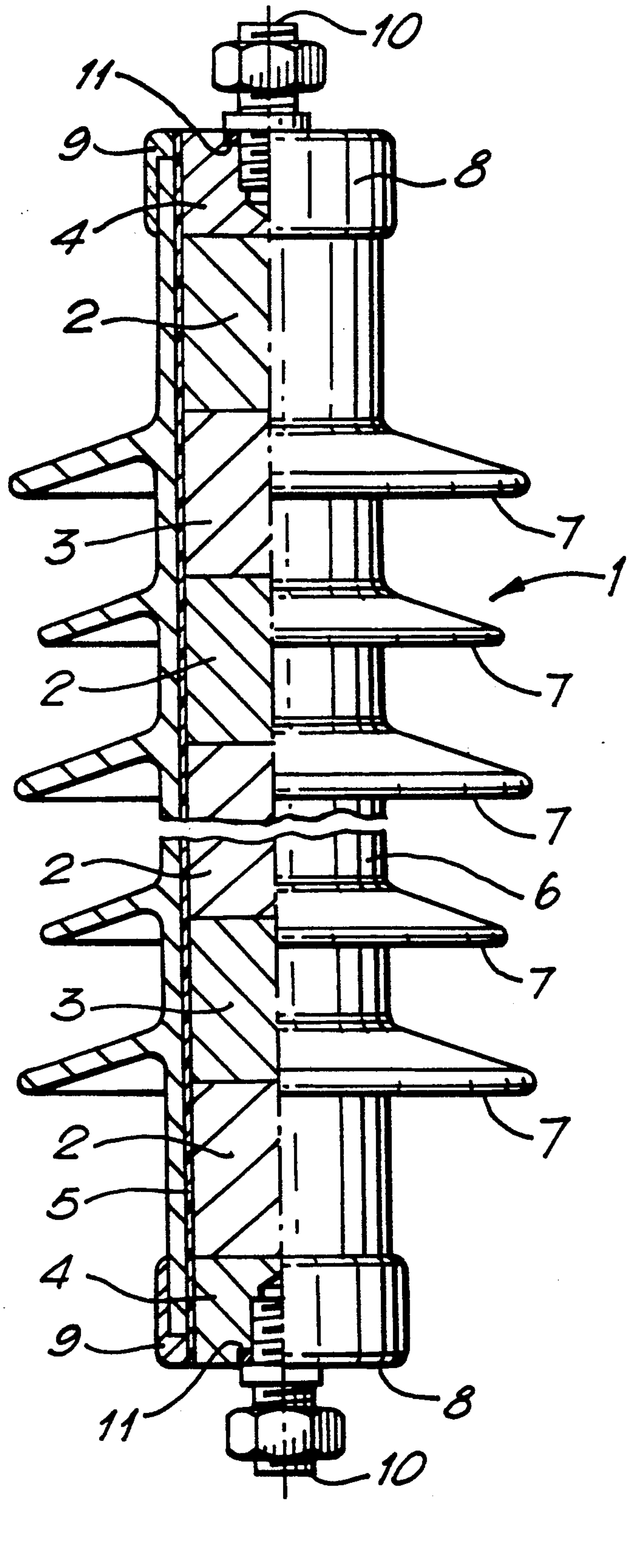
FIG. 1 shows an exemplary prior art polymeric surge arrester in accordance with the teachings of our applicant's British Patent Application No. 2188199.

Referring to FIG. 1, shown therein partly in sectional view and partly in side elevational view is an exemplary surge arrester 1 according to the teachings of GB 2188199 aforementioned. The surge arrester 1 comprises metal oxide varistor blocks 2, aluminum alloy heat sink/spacer blocks 3 and terminal blocks 4 structurally combined within a glass reinforced plastic shell 5 which is bonded to the outer cylindrical surfaces of the blocks 2, 3 and 4. The varistor blocks 2, heat sink/-spacer blocks 3, terminal blocks 4 and the glass reinforced plastic shell 5 constitute a unitary structural arrester core of great physical strength wherein the facing surfaces of the respective blocks are held and preferably are adhered by use of suitable conductive adhesive in face to-face physical and electrical contact without air entrapment or bleed of plastic material. A heat-shrink sleeve 6 with integral sheds 7 of alternating greater and lesser diameter as shown, and with the sheds desirably profiled to encourage shedding of surface moisture, is shrunk about the arrester core with inter-positioning of a fluid mastic material to ensure that the interface between the heat-shrink sleeve and the outer surface of the arrester core is free of voids or air entrapment and cannot be ingressed by moisture. Stainless steel end caps 8 are fitted to each end of the arrester with a silicone rubber or like sealant 9 filling the spaces between the interior of the end caps and the arrester core, and are retained by stainless steel terminal assemblies 10 which are screw-threadedly engaged with the terminal blocks 4 with seals 11 provided to prevent moisture ingress into the mated screw threads. It is to be noted that the skirt portions of the end caps 8 terminate on a level with the juncture between the respective terminal block 4 and the varistor block 2 in contact therewith to avoid the establishment of voltage gradients at these two positions which otherwise could detrimentally affect the intervening dielectric material.

The metal oxide varistor blocks 2 are commercially available from Meidensha, for example, and preferably comprise zinc oxide non-linear resistor material. The heat-shrink sleeve 6 is available from Raychem and can be sealed against the glass reinforced plastic shell 5 by means of Raychem PPS 3022 sealant, for example, and the same sealant could be used for sealing the end caps 8 against the polymeric heat shrink material.

Varistor valve blocks are commonly available in cylindrical form with metallized aluminum contacts on their flat end faces and with their circumferential curved surface coated with an electrically insulating material. The heat sink/spacer elements are preferably formed of aluminum or an aluminium alloy as cylinders of the same diameter as the varistor valve blocks. The varistor valve blocks are provided in sufficient number to give the desired electrical resistance characteristics for the arrester, and the heat sinks/spacers are provided in sufficient number to give the arrester a sufficient length between its terminals to enable it to withstand its rated voltage without arcing, and are distributed with the valve blocks so as to grade the voltage drop throughout the overall length of the arrester. A range of differently sized and differently rated distribution class surge arresters ranging from 6 KV to 36 KV, for example, can thus be constructed in accordance with the principles of FIG. 1 simply by varying the number and the distribution of the varistor blocks 2 and aluminum heat sink/spacer blocks 3 so as to vary the length of the arrester, and further details in this respect may be found in British Patent application No. 2188199.

The reinforced plastic shell may be a preformed tube within which the valve blocks, the terminal blocks and the heat sinks/spacers are assembled and potted with synthetic resin material, but it is preferred in accordance with the teachings of GB 2188199 to first assemble the valve blocks, the terminal blocks and the heat sinks/spacers in their desired array and then to wrap a pre-preg material comprising a resin impregnated textile fabric or mat of fibrous reinforcing material about the array, with the array held in axial compression, and thereafter to cure the resin. As described in GB 2188199, the curing of the resin is preferably effected thermally under mold pressure so as to ensure that no voids or gaseous inclusions are present in the finished arrester. Alternatively, it may be effected by the equivalent technique of helically wrapping the arrester core with its pre-preg wrapping in a heat-shrink tape (e.g., a Mylar tape), then heat-curing the resin and finally removing the tape.

Having thus formed the arrester core, the assembly to the core of the outer housing of heat-shrink material (sometimes referred to as heat-recoverable material) or mechanically released elastomeric material or in-situ molded synthetic resin material is a simple matter. Heat shrink sleeves with integral sheds which are suitable for this purpose are available from Raychem Limited and are the subject of Raychem's British Patents 1,530,994 and 1,530,995, the disclosures of which are incorporated herein by reference. The heat-shrink material has desirable anti-tracking and other electrical properties which adapt it to utilization as a high voltage electrical insulator. A mastic sealant is utilized within the heat-shrink sleeve to ensure that the interface between the outer housing of heat shrink material and the reinforced plastic shell of the arrester core is void-free and impervious to moisture penetration, etc., and such mastic sealant is also available from Raychem Limited. As an alternative to heat-shrink material, an elastomeric material such as EPDM or silicone rubber could be used, the core being forced into the sleeve or the elastomer sleeve being mechanically expanded and introduced onto the core and then being released so as to elastically contract into tight engagement with the core surface, a weatherproof sealant preferably sealing the interface between the core and the elastomer sleeve. Synthetic rubber type EPDM sleeves with integral sheds which are suitable for this purpose are available from GEC-Henley. Alternatively, the outer housing could be molded onto the preformed arrester core.

As compared to an equivalent conventional porcelain housed surge arrester, a surge arrester constructed in accordance with the teachings of FIG. 1 has the significant advantage of displaying a non-explosive failure mode and affords yet further advantages in that it is lightweight, weighing only around half as much as a conventional arrester, and yet is very strong, robust and is resistant to damage through vandalism and improper handling, and is unaffected by atmospheric pollutants and impervious to moisture ingress. It has only fairly recently been appreciated that some previously unexplained failures of conventional surge arresters could have resulted (and most probably did result) from the effects of ionization within the arrester producing a reducing atmosphere which increases the electrical conductivity of the varistor elements. These effects are exacerbated by the presence of moisture within the arrester, and by external atmospheric pollution which tends to increase the internal electrical stressing of the varistor elements. By avoiding the entrapment of gas or moisture, the surge arrester of FIG. 1 completely obviates these problems of conventional porcelain housed surge arresters. Moreover, the surge arrester of FIG. 1 can be manufactured at lower cost than a conventional porcelain housed surge arrester.

It will have been noted that the aluminum blocks 3 have been referred to hereinabove as heat sinks/spacers. This is because the blocks 3 do in fact perform two essential functions. Firstly they serve as heat sinks within the arrester which operate to safeguard the structural integrity of the arrester core by provision of substantial thermal sinks at the faces of the varistor blocks 2, and secondly they serve to elongate the arrester so as to achieve the required arcing distance. In similar fashion, the glass reinforced plastic shell 5 serves the dual functions of providing for the structural integrity of the arrester core assembly and also serving as a thermal barrier. As will be appreciated by those skilled in the art, in the short-circuit failure mode of the arrester (and statistically every arrester is unavoidably liable to fail in this potentially most hazardous mode) which would last only for a fraction of a second until a circuit breaker trips in the associated power system, a very high transient current would flow through the arrester with the generation in consequence of temperatures of the order of 2000° C. within the arrester core; the glass reinforced plastic shell serves to protect the polymeric outer housing of the arrester from this transient temperature extreme, thereby ensuring the structural integrity of the arrester throughout and after the duration of the transient. A conventional porcelain housed arrester would most likely shatter explosively as a result of such a transient condition.

The surge arrester of FIG. 1 is achieving increasing penetration in the distribution class surge arrester market where, as described above, it has considerable advantages over a conventional porcelain housed arrester. However, as aforementioned, it has not been regarded as inherently suited to higher voltage applications where the porcelain housed arrester reigns supreme irrespective of its significant and widely recognized disadvantages. The present invention provides a breakthrough for the polymeric arrester of FIG. 1, and for similarly constructed arresters within the ambit of British Patent Application No. 2188199, into the higher voltage arrester market.

Figure 2:
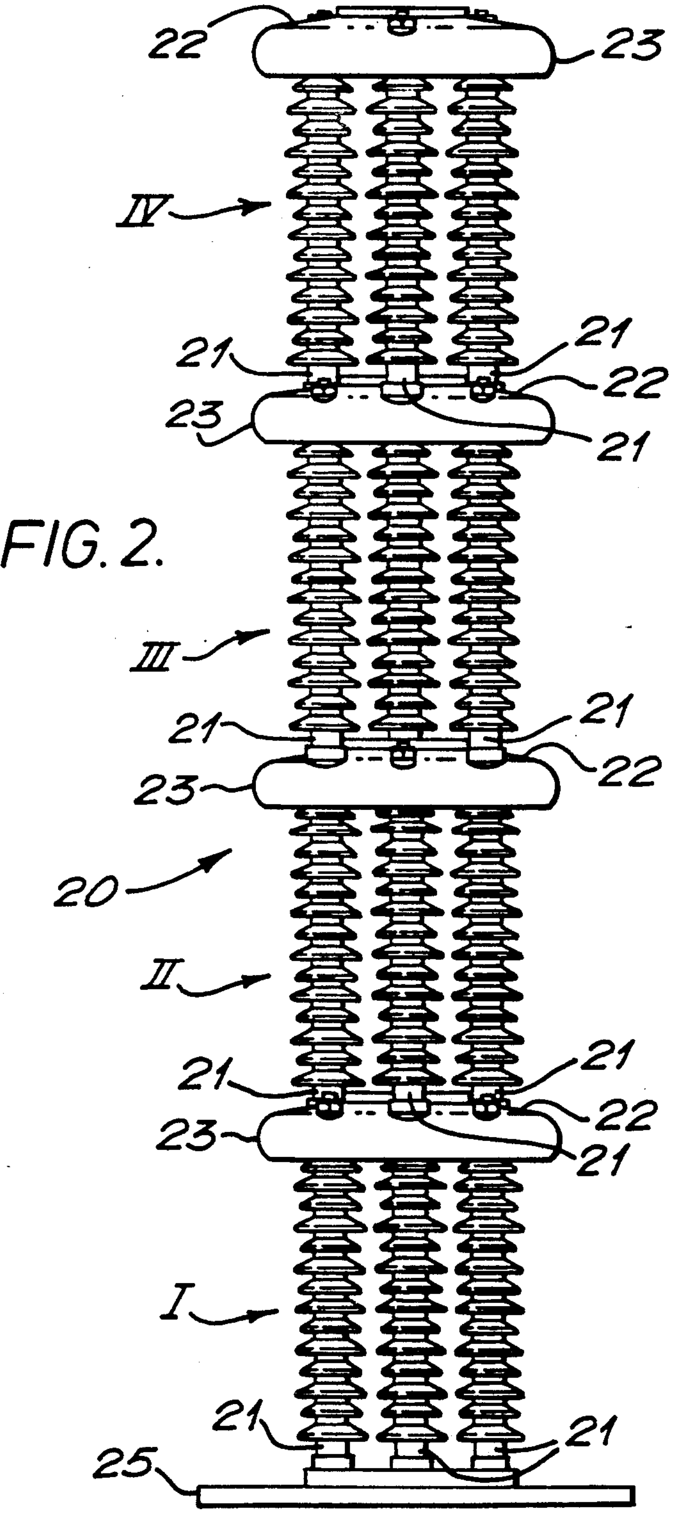
FIG. 2 shows a schematic side elevation view of a 120 KV station class surge arrester constructed in accordance with the present invention as a series parallel network of a plurality of the surge arresters of FIG. 1.

FIG. 2 of the accompanying drawings schematically shown an exemplary 120 KV station class surge arrester 20 in accordance with the present invention, the arrester comprising four 30 KV stages connected in series and each stage comprising three 30 KV arresters connected in parallel, of the kind disclosed and claimed in British Patent Application No. 2188199 and exemplified by FIG. 1 of the accompanying drawings. The four stages of the arrester are designated I, II, III and IV in FIG. 2, and each stage comprises three polymeric arresters 21 mounted symmetrically and equidistantly from one another around the periphery of a circular frustoconical mounting plate 22 formed as shown in more detail in FIGS. 4A and 4B and made of heavy gauge aluminum or aluminum alloy, for example, and dimensioned in accordance with Table 2. The arcing distance across each polymeric arrester 21, i.e., the vertical distance between its end caps, might be 380 mm (15 inches) in accordance with the teaching of FIG. 2 of GB 2188199. A corona ring 23 formed integrally with the mounting plate 22 is provided at the top of each stage of the arrester 20 for the elimination of corona discharge effects, the provision of such corona rings in high voltage installations being known per se, though not in the manner of the present invention. A line terminal (not shown) may be provided at the top of the arrester 20, and the assembled structure stands upon a base 25.

The precise form of the mounting plates 22 and of the corona rings 23 is susceptible to variation depending upon the intended application, for example as to whether the arrester is for indoor or outdoor use. In indoor applications the mounting plates can simply be flat circular plates, but for outdoor applications there should, for example, be provision for drainage and to ensure that ice does not build up within the arrester, and in these situations annular mounting plates might be provided. The corona rings 23 can be formed integrally with the mounting plates or can be separate add-on structures.

Figure 3:
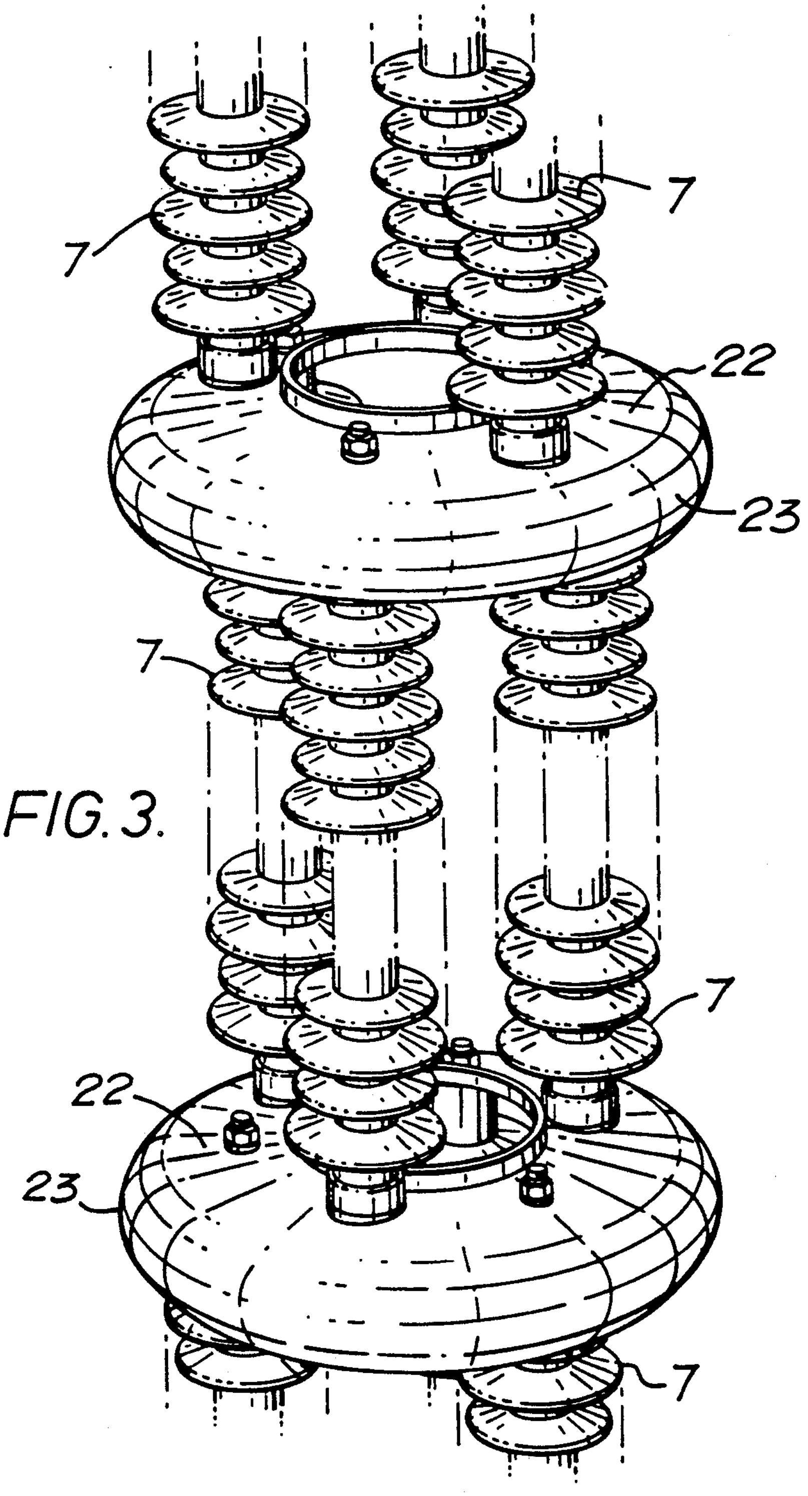
FIG. 3 is a perspective view showing one stage of the surge arrester of FIG. 2 and the mode of its connection to adjacent stages.
Figure 4A:
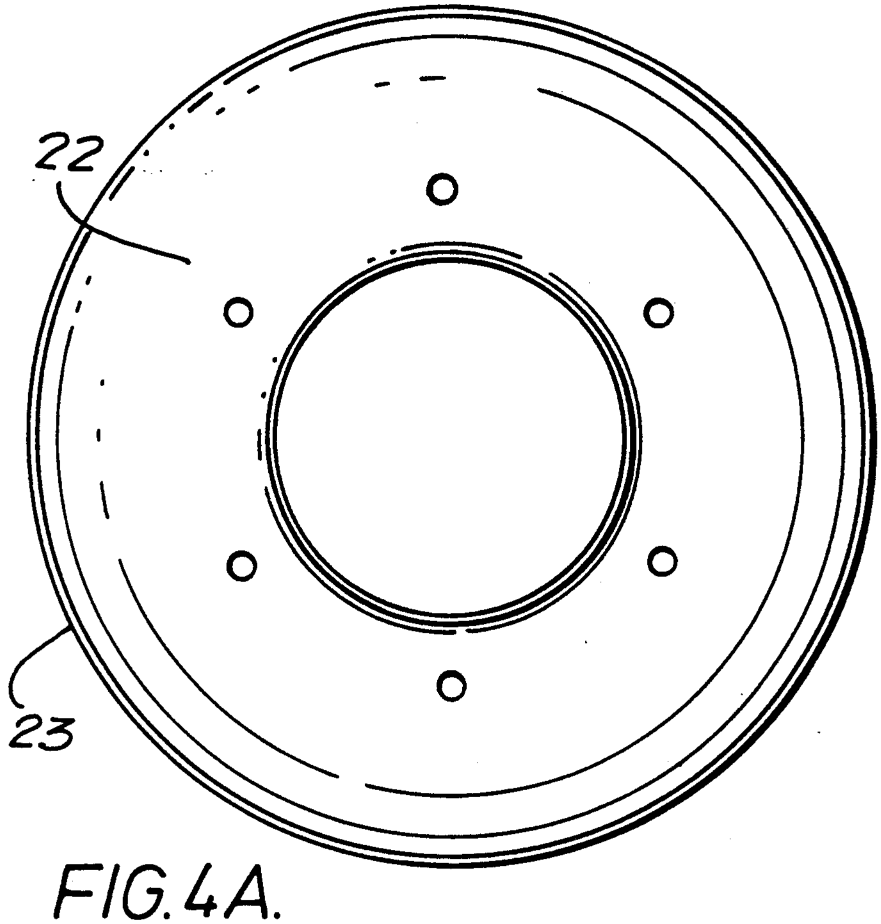
FIGS. 4A and 4B are, respectively, plan and sectional side elevation views of a preferred mounting plate/-corona ring configuration.
Figure 4B:
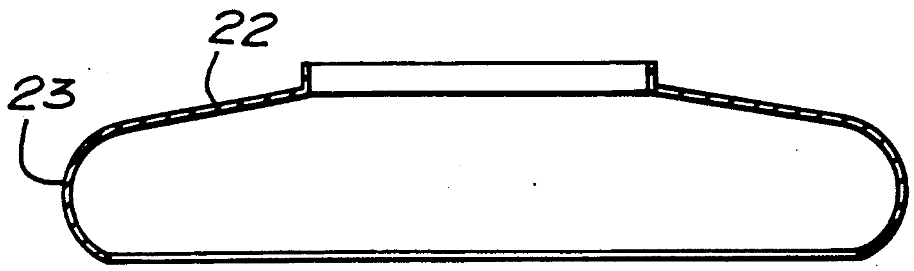

FIGS. 4A and 4B show the presently preferred form of a combined mounting plate and corona ring as utilized in the series parallel surge arrester configuration shown, in FIGS. 2 and 3. As shown the mounting plate 22 has an upwardly dished, frustoconical shape designed to facilitate run-off of rainwater when the arrester configuration is used outside in the weather and smoothly at its external periphery into the arcuate surface of the corona ring 23. Since the individual polymeric surge arresters of FIG. 1 will, by virtue of the inclination of the mounting plate 22, be attached at each end to an inclined surface, appropriately shaped washers (which advantageously could be formed integrally with the mounting plate) are utilized to ensure that the individual surge arresters mount to their mounting plates in a proper orientation.

The series parallel arrangement of FIGS. 2 and 3, and similar series parallel arrangements in accordance with the present invention which utilize a plurality of relatively low voltage rating polymeric arresters to form a relatively high voltage arrester, has many significant advantages among which are the following:

any overall system voltage and energy requirement can be accommodated using a single unit rating;

the series parallel arrester can be assembled on site with manual labor only, no lifting equipment being needed the series parallel arrester can be transported to site as individual components to be assembled on site, thereby avoiding the transportation difficulties encountered with conventional high voltage arresters;

the strength of the individual polymeric arresters virtually eliminates any risk of damage during transportation and erection;

manufacturing time, in terms of handling and testing, is reduced as compared with porcelain housed arresters;

type testing need only be carried out at highest duty (Class 5);

problems of internal ionization leading to degradation of the varistor elements are eliminated;

problems relating to system short circuit currents (i.e., pressure relief capability) are eliminated achieves more efficient cooling of varistor elements;

additional grading capacitances or other components are easily added at appropriate stages;

one size of varistor element can cover all system voltages and duties (most manufacturers currently use at least three different sizes);

only simple test equipment is required during commissioning tests (i.e., a portable AC or DC test set with output as for a single unit arrester, namely 30 to 40 KV);

low weight construction reduces the cost of supporting structures and the arrester can be mounted directly on the transformer tank or cable end sealing supporting structure;

can be easily uprated or downrated if system voltage is changed;

reduces customer's storage and stock problems in that only one size of arrester unit is required for all situations;

eliminates the risk of incorrect assembly;

service performance can easily be visually monitored in contrast to the situation with porcelain housed arresters;

earthquake response superior to porcelain arresters owing to the low mass and the rigid internal construction of the polymeric arrester units.

As will readily be appreciated by those skilled in the art relevant knowledge and experience, advantages, which are not listed in any particular order, represent a very substantial improvement over conventional high voltage arresters.

While the present invention has been described by reference to a particular embodiment, it is to be appreciated that many modifications and variations are possible without departure from the broad ambit of the invention which is to construct a high voltage surge arrester, such as a station class arrester, as a series parallel network comprising a plurality of polymer housed low voltage arresters such as are described and claimed in British Patent Application No. 2188199, for example. While it is preferred to make use of polymeric surge arresters in accordance with our British Patent Application No. 2188199 in the practice of the present invention, any other polymeric surge arrester demonstrating similar properties of light weight and high physical strength could alternatively be used.

For example, while the polymeric surge arrester specifically described in British Patent Application No. 2188199 is preferred for the purposes of the present invention because of its outstanding physical strength properties coupled with superlative electrical performance, applicant is aware of the surge arrester proposal described in U.S. Pat. No. 4,656,555, in accordance with which the varistor blocks are retained in face-to-face contact with each other and with terminal blocks by means of a filamentary winding carrying a synthetic resin material. While to date applicant has conducted no tests to determine whether the constructional technique described in U.S. Pat. No. 4656555 is capable of achieving a surge arrester having sufficient physical strength for the purposes of the present invention, it is conceivable that it does or could be modified to do so, and accordingly it is regarded as being within the ambit of the present invention to construct a series parallel type surge arrester from, polymeric surge arresters as described in the said U.S. Patent or substantially as therein described on the assumption that they have sufficient physical strength. Applicant is also aware of a very recent proposal to construct a polymeric surge arrester as specifically described in British Patent Application No. 2188199, except for the interpositioning of spring washers between the terminal blocks and the stack of varistor blocks and the provision of a thin tubular elastomeric membrane around the varistor block stack and between the varistor block stack and the encasing resin-impregnated glass fibre wrapping and, whilst to date no test have been conducted on such an arrester construction, it would be possible to use such an arrester in the construction of a series parallel arrester configuration in accordance with the present invention so long as sufficient physical strength in the arrester could be attained.

I claim:

1. A station class electrical surge arrester having a relatively high voltage rating of the order of 120 kV to 525 kV, said arrester comprising a plurality of series-connected stages each of which comprises a plurality of electrically matched parallel-connected distribution class surge arresters connected in parallel with each other by means of metallic conductors, each of said distribution class surge arresters having a relatively low voltage rating of the order of 24 kV to 36 kV and being of a gapless, high physical strength configuration including a rigid core comprising ceramic varistor blocks encased within an polymeric housing, and corona discharge suppression means provided at a top of said arrester and at series interfaces of said plurality of series-connected stages.

2. A station class electrical surge arrester as claimed in claim 1, wherein said distribution class surge arresters each have an elongate core comprising varistor blocks and terminal blocks encased within a rigid shell of reinforced plastic material, and said core is encased within a shedded polymeric outer housing.

3. A station class electrical surge arrester as claimed in claim 1, wherein said distribution class surge arresters each have an elongate core comprising varistor blocks and terminal blocks encased within a rigid shell of reinforced plastic material which is bonded to the peripheral surfaces of at least the terminal blocks, and said core is encased within a shedded polymeric outer housing.

4. A station class electrical surge arrester as claimed in any one of claim 1 to 3, wherein said varistor blocks are metal oxide varistors blocks.

5. A station class electrical surge arrester as claimed in claim 4, wherein said metal oxide is zinc oxide.

6. An electrical surge arrester as claimed in any one of claims 1 to 3, wherein the cores of said distribution class surge arresters further comprise heat sink/space blocks distributed with the varistor blocks.

7. A station class electrical surge arrester as claimed in claim 2 or 3, wherein said rigid shell of reinforced plastic material comprises a filamentary or sheet carrier of uncured plastic material wound or wrapped about said blocks and subsequently cured.

8. A station class electrical surge arrester as claimed in claim 1, wherein said polymeric housing comprises one of heat-shrink material shrunk onto said core, elastomeric material released onto said core, and plastic material molded in situ on said core.

9. A station class electrical surge arrester as claimed in any one of claims 1 to 3 and 8, wherein each of said series-connected stages comprises a plurality of said distribution class surge arresters mounted electrically in parallel with each other between metallic mounting plates disposed generally parallel to each other.

10. A station class electrical surge arrester as claimed in claim 9, wherein said mounting plates are circular and the plurality of distribution class surge arresters in each stage are uniformly spaced apart from each other circumferentially of said mounting plates.

11. A station class electrical surge arrester as claimed in claim 10, wherein the plurality of distribution class surge arresters in each stage are circumferentially offset with respect to the plurality of distribution class surge arresters of the or each next adjoining stage.

12. A station class surge arrester as claimed in claim 9, wherein said mounting plates are annular to facilitate drainage of rainwater from the arrester and to discourage the build-up of ice within the arrester.

13. A station class electrical surge arrester as claimed in claim 9, wherein corona discharge suppression means are formed integrally with the mounting plates.

14. A station class electrical surge arrester as claimed in claim 13, wherein the mounting plates have an upwardly dished frustoconical shape for facilitating run-off of rainwater and merging at its external periphery into an arcuate surface defining a corona discharge suppression ring.

15. A station class high voltage electrical surge arrester comprising a plurality of series-connected stages each of which comprises a plurality of electrically matched, high physical strength, polymeric type, distribution class, low voltage surge arresters connected in parallel with each other, each said stage comprising an electrically conductive metallic mounting plate to which the plurality of distribution class low voltage surge arresters in the respective stage are mounted with uniform spacing apart from each other and a corona discharge suppression ring electrically connected to said mounting plate, there being a said corona discharge suppression ring at a top of said arrester, said polymeric type distribution class low voltage surge arresters each comprising a solid cylindrical core comprising varistors blocks and end terminals, said core being enclosed within a reinforcing shell and housed within a shedded polymeric housing, and the polymeric type distribution class low voltage surge arresters of each stage each being physically and electrically coupled at one end terminal thereof to the electrically conductive mounting plate of the respective stage and being upstanding therefrom for being physically and electrically coupled at the opposite end terminal to the electrically conductive mounting plate of the next stage in the series.

16. A station class surge arrester as claimed in claim 15, wherein said corona discharge suppression ring is formed integrally with said mounting plate.

17. A station class surge arrester as claimed in claim 16, wherein the mounting plates have an upwardly dished frustoconical shape for facilitating run-off of rainwater and merging at its external periphery into an arcuate surface defining a corona discharge suppression ring.

18. A station class surge arrester as claimed in claim 17, wherein said mounting plates are annular to facilitate drainage of rainwater from the arrester and to discourage the build-up of ice within the arrester.

19. A station class surge arrester as claimed in claim 15, wherein the voltage rating of the arrester is of the order of 120 kV to 525 kV, while the voltage rating of the constituent distribution class surge arresters is only of the order of 24 kV to 36 kV.

* * * * *